(12) United States Patent
Urshan, II

(10) Patent No.: US 12,389,887 B2
(45) Date of Patent: Aug. 19, 2025

(54) MARINE LIFE SANCTUARY

(71) Applicant: NJB Limited, LLC, Durham, NC (US)

(72) Inventor: Nathaniel A. Urshan, II, Durham, NC (US)

(73) Assignee: FPC Worldwide Ministries, Inc., Durham, NC (US)

( * ) Notice: Subject to any disclaimer, the term of this patent is extended or adjusted under 35 U.S.C. 154(b) by 13 days.

(21) Appl. No.: 18/312,240

(22) Filed: May 4, 2023

(65) Prior Publication Data

US 2024/0365759 A1    Nov. 7, 2024

Related U.S. Application Data

(63) Continuation-in-part of application No. 17/154,230, filed on Jan. 21, 2021, now abandoned.

(51) Int. Cl.
*A01K 61/70*    (2017.01)

(52) U.S. Cl.
CPC ..................... *A01K 61/70* (2017.01)

(58) Field of Classification Search
CPC ........................................ A01K 61/70
See application file for complete search history.

(56) References Cited

U.S. PATENT DOCUMENTS

| | | | |
|---|---|---|---|
| 5,669,330 A * | 9/1997 | O'Hare ................ | A01K 61/70 119/221 |
| 7,245,041 B1 * | 7/2007 | Olson ................ | F03B 13/1885 60/497 |
| 7,512,326 B1 * | 3/2009 | Eldredge ............. | G03B 17/08 396/25 |
| 7,827,937 B1 * | 11/2010 | Walter ................ | E02B 3/046 119/221 |
| 7,828,493 B1 * | 11/2010 | Brignac ............... | A01K 61/70 119/221 |
| 8,635,973 B1 * | 1/2014 | Shepard, III ......... | A01K 61/70 119/221 |
| 9,339,017 B1 * | 5/2016 | Walter ................ | E02B 3/046 |
| 12,000,105 B2 * | 6/2024 | Gallagher ............ | E02D 5/60 |
| 2009/0320766 A1 * | 12/2009 | Calinski ............... | A01K 61/60 119/200 |
| 2017/0334530 A1 * | 11/2017 | Hargrave ............. | E02D 5/22 |

FOREIGN PATENT DOCUMENTS

WO    WO-0113710 A2 *    3/2001    .......... A01K 61/006

\* cited by examiner

*Primary Examiner* — Monica L Perry
*Assistant Examiner* — Brittany A Lowery
(74) *Attorney, Agent, or Firm* — James G Passe; Passe Intellectual Property

(57) ABSTRACT

An improved marine life sanctuary assembly that is completely underwater and is designed to duplicate a natural mangrove that provides protection and promotes an underwater ecosystem, which can help reverse the decline in the fish population, aviary habitats, erosion, and the like and help to promote land and marine colonization.

4 Claims, 2 Drawing Sheets

MARINE LIFE SANCTUARY

This application is a continuation-in-part of U.S. non-provisional application Ser. No. 17/154,230 filed on Jan. 21, 2021, and which is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to an aquatic marine life ecosystem. In particular, it relates to an artificial mangrove that is designed for placement completely underwater and provides protection for smaller fish as well as other flora and fauna.

Description of Related Art

The mangrove is a type of naturally occurring coastal ecosystem where mangrove trees and their roots grow in saline coastal shoreline sediment. Mangrove ecosystems are usually found in the subtropics and in the tropics. They also only exist at certain latitudes, though most coastal areas could use them.

Because the roots are positioned in the water, the roots form a habitat for marine life of all sizes. In addition, they trap nutrients and promote marine life colonization. However, these natural mangroves are disappearing for a number of reasons including logging, urban development, and tourism. The decreasing number of mangrove ecosystems contributes to many ocean problems including a decline in the fish population, threats to birds and their habitats, erosion, and the like.

Current artificial structures are inadequate for providing a complete sanctuary for all marine life, especially small and microscopic marine organisms. In addition, there are no structures designed to attach to a dock piling. Examples of current artificial structures include sea walls whose primary purpose is erosion control. More recently, an artificial "mangrove assembly" has been developed, but the assembly provides only a limited amount of shelter space for marine life. It has a very large diameter and its roots are positioned at a 90° angle to the attachment point. In addition, it provides little to no protection for smaller aquatic life and does not provide sufficient surface area for colonization. There is a need for an artificial mangrove marine life sanctuary that overcomes the problems of previous structures.

BRIEF SUMMARY OF THE INVENTION

The present invention relates to a marine life sanctuary that attaches to a dock piling and, in one embodiment, to the body of water side (as opposed to shore side) designed as an aquatic life sanctuary. Primary connection roots are attached to the piling coupler, secondary connection roots are attached to the primary connection root, and optional tertiary connection roots are attached to secondary roots. This construction is an improvement over previous artificial mangroves in that it provides shelter for even the smallest aquatic creatures of the coast. The present invention is easier to assemble (especially on existing pilings), less expensive to build, functions better as compared to previous artificial systems, and is designed to be an underwater sanctuary for marine life.

Accordingly, in one embodiment, there is a positionally fixed marine life sanctuary designed for placement completely underwater near a shoreline of a body of water comprising:
   a) a piling coupler for fixed attachment to a piling;
   b) a plurality of primary connection roots connected to the piling coupler;
   c) one or more secondary connection roots attached to the primary connection roots;
   d) one or more positionally fixed anchors having the primary and secondary connection roots anchored thereto.

DETAILED DESCRIPTION OF THE INVENTION

Figure 1:
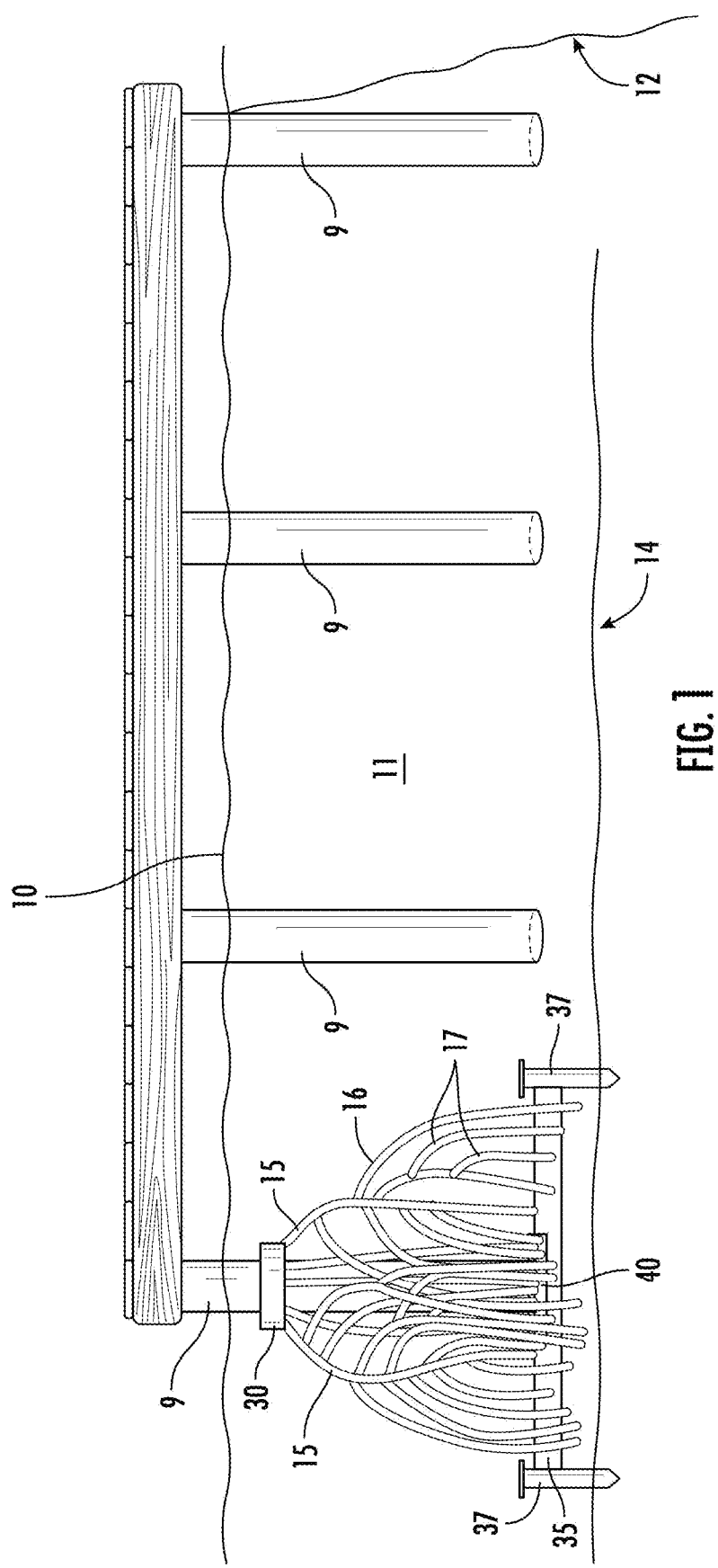
FIG. 1 is an embodiment of the present invention wherein the system is attached to a dock piling.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupler", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "positionally fixed marine life sanctuary" refers to an artificial construction that attempts to mimic a natural mangrove ecosystem that remains in a fixed location. Construction materials include marine grade plastic, rubber, and the like. Their use would be to duplicate the shelter that natural mangroves provide as much as is possible. In one embodiment, it means that there are roots of a selected material extending in various directions and having a diameter that closely resembles the structure of a natural mangrove. The structure is completely underwater so that it acts as a habitat rather than as erosion control. Marine life sanctuaries are positioned very close to the shoreline and generally lie in shallow water, unlike many erosion control systems.

As used herein, the term "piling coupler" refers to a device for a positionally fixed attachment to a dock piling. The attachment could be screws, bolts, and the like. In one embodiment, it is a device which attaches bolts around the piling as shown in FIG. 1. The piling coupler has primary connection roots which extend to an anchor attached to the bottom of body of the water they are in.

As used herein, the term "fixed" refers to a non-removable attachment of the piling coupling to a dock piling.

As used herein, the term "primary connection roots" refers to roots being connected to the piling coupler and angled downward from the pilings. This can be done in any convenient way including melt bonding, adhesives, straps, ropes, and the like to the piling coupling. Materials for making the primary angled connection roots include, but are not limited to, marine grade plastic and rubber. In one embodiment, they are made from the same material as the secondary angled connection roots. The primary angled connection roots drape downward from the piling coupler to the bottom of the body of water and attach to a positionally fixed anchor.

As used herein, the term "secondary connection roots" refers to roots that are connected to the primary connection roots or to other secondary connection roots. They extend all the way to the bottom of the body of water and attach to a fixed anchor. Materials for making the secondary connection roots include, but are not limited to, marine grade plastic and rubber. Primary and secondary roots that reach the bottom are attached to a connection bar fixed to the body of the water bottom. All roots, in one embodiment, will have a diameter of about 1 inch or less.

As used herein, the term "positionally fixed anchor" refers to a device, system, or the like, fixedly mounted to the bottom of the body of water (e.g., by staking) to which connection roots are connected. The primary and secondary roots each attach to the fixed anchor. The bar can be made of any material useful in underwater applications.

As used herein, the term "tertiary connection roots" relates to optional additional roots attached to secondary connection roots.

As used herein, the term "body of water" refers to any body of water where an artificial marine life sanctuary could be placed near the shoreline of the body of water. Examples include seas, oceans, lakes, rivers, gulfs, bays, and the like. The body of water will have a bed where primary and secondary roots are attached to an anchor imbedded in the bed.

Drawings

FIG. 1 is a perspective view of the embodiment of the present invention showing attachment to a piling and anchoring of connection roots. In this embodiment, piling coupler 30 is connected in a fixed manner as a collar bolted to the piling 9 below the surface 10 of a body of water 11 and near shoreline 12. Seabed 14 is shown with the connection bar 31 connected thereto.

Attached to piling coupler 30 are primary connection roots 15. Attached to the primary connection roots 15 are tertiary connection roots 16, while other secondary connection roots are connected to other secondary roots 17. Connection bar 35 is attached to the water bed by attachment devices 37. A number of primary and secondary angled connection roots are attached 40 to connection bar 35.

Figure 2:
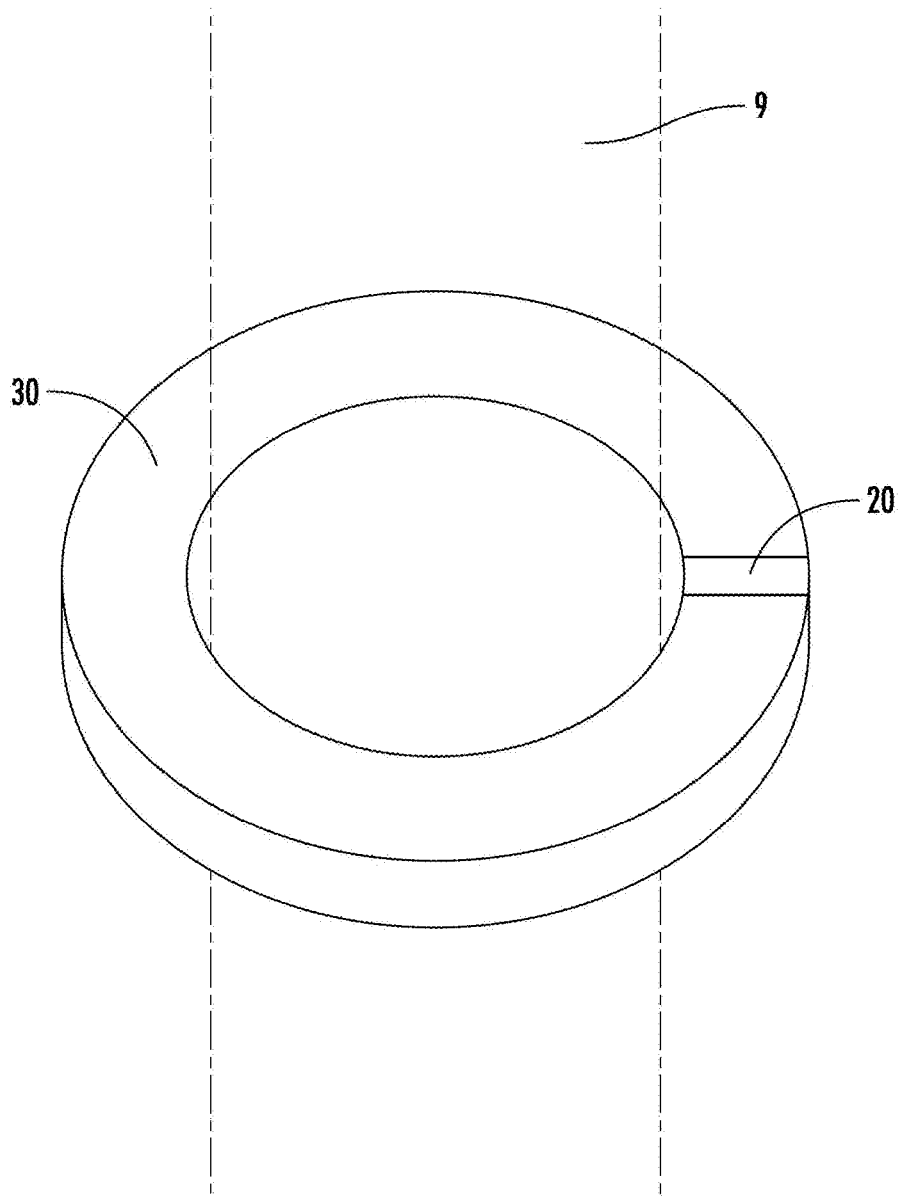
FIG. 2 is a perspective view of a dock piling coupler.

FIG. 2 is an isolated perspective view of the piling coupler 30 embodiment connected to piling 9. The piling coupler 30 wraps around the piling 9 and is attached with bolts 20 or other attachment devices.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:
1. A positionally fixed marine life sanctuary comprising:
 a) a structure that extends out into a body of water having a water bed, the structure supported by one or more pilings;
 b) a single piling coupler that is attached entirely around one of the one or more pilings and is positionally fixed thereto;
 c) a plurality of primary connection roots a first end positionally fixed to the single piling coupler;
 d) one or more secondary connection roots a first end positionally fixed to the primary connection roots;
 e) a connection bar fixedly attached to the water bed of the body of water wherein a second end of the primary and secondary connection roots is attached thereto, positioned to keep the primary and secondary connection roots second ends from moving.

2. The positionally fixed marine life sanctuary according to claim 1 wherein the primary and secondary connection roots are made from one or more of the group consisting of marine grade plastic and rubber.

3. The positionally fixed marine sanctuary according to claim 1, which further comprises tertiary connection roots a first end connected to the secondary connection roots and a second end attached to the connection bar.

4. The positionally fixed marine life sanctuary according to claim 1 wherein the marine life sanctuary is positioned completely underwater.

* * * * *